United States Patent
Zhang et al.

(10) Patent No.: US 11,611,435 B2
(45) Date of Patent: Mar. 21, 2023

(54) AUTOMATIC KEY EXCHANGE

(71) Applicant: ServiceNow, Inc., Santa Clara, CA (US)

(72) Inventors: Shicheng Zhang, Daly City, CA (US); Huiqing Wen, San Diego, CA (US); Gregory Frederick Gibsen, San Diego, CA (US); Shu-Wei Hsu, Rancho Cucamonga, CA (US); Pierre Francois Rohel, San Francisco, CA (US)

(73) Assignee: ServiceNow, Inc., Santa Clara, CA (US)

( * ) Notice: Subject to any disclaimer, the term of this patent is extended or adjusted under 35 U.S.C. 154(b) by 41 days.

(21) Appl. No.: 17/150,760

(22) Filed: Jan. 15, 2021

(65) Prior Publication Data
US 2022/0231848 A1 Jul. 21, 2022

(51) Int. Cl.
*H04L 9/08* (2006.01)
*H04L 9/32* (2006.01)

(52) U.S. Cl.
CPC .......... *H04L 9/0894* (2013.01); *H04L 9/0819* (2013.01); *H04L 9/0861* (2013.01); *H04L 9/3213* (2013.01); *H04L 9/3247* (2013.01)

(58) Field of Classification Search
CPC ....... H04L 9/08; H04L 9/0819; H04L 9/0894; H04L 9/0861; H04L 9/0822; H04L 9/32; H04L 9/3213; H04L 9/3247; H04L 63/06; H04L 63/061; H04L 63/062
See application file for complete search history.

(56) References Cited

U.S. PATENT DOCUMENTS

| | | | |
|---|---|---|---|
| 5,796,830 | A | 8/1998 | Johnson |
| 8,656,484 | B2 | 2/2014 | Barton |
| 8,774,415 | B2 | 7/2014 | Baba |
| 9,716,728 | B1* | 7/2017 | Tumulak ................. H04L 9/083 |
| 10,346,618 | B1* | 7/2019 | Ah Kun .............. G06F 12/1408 |
| 11,080,041 | B1* | 8/2021 | Ah Kun .............. G06F 9/44505 |
| 2007/0248232 | A1 | 10/2007 | Driscoll |
| 2011/0293096 | A1* | 12/2011 | Reilly ................... H04L 9/0833 380/277 |
| 2013/0259234 | A1* | 10/2013 | Acar ....................... H04L 9/088 380/278 |
| 2021/0111886 | A1* | 4/2021 | Leiserson ........... G06F 21/6209 |

FOREIGN PATENT DOCUMENTS

| | | |
|---|---|---|
| CN | 1926837 | 3/2007 |
| WO | 20121079463 | 8/2012 |

* cited by examiner

*Primary Examiner* — Shaqueal D Wade-Wright
(74) *Attorney, Agent, or Firm* — Van Pelt, Yi & James LLP

(57) ABSTRACT

A cryptographic key of a first instance of a group of one or more cloud nodes providing a service is managed. A request to share the cryptographic key with a second instance of a different group of one or more cloud nodes is received. A determination is made whether the second instance is allowed to access the cryptographic key. In response to a determination that the second instance is allowed to access the cryptographic key, the cryptographic key is encrypted with a target key of the second instance and the encrypted cryptographic key is signed using a cryptographic signature of the first instance. The signed encrypted cryptographic key is provided to the second instance.

20 Claims, 7 Drawing Sheets

AUTOMATIC KEY EXCHANGE

BACKGROUND OF THE INVENTION

Cloud instances allow a group of cloud nodes to be treated as a single unit. The software and hardware along with data and configuration settings associated with the instance can be manipulated together. For example, a cloud instance can be replicated multiple times to scale up available resources in response to increased demand. As another example, a cloud instance can be duplicated to create a development or testing instance while leaving the production instance untouched. Once the development has completed, the changes can be pushed to an updated instance to replace the existing production instance. Typically, the replication of a cloud instance involves duplicating software installations onto new hardware, which can include actual physical hardware and/or virtualized hardware. Duplication of the software installation and configuration settings can include replicating any stored data, such as customer data including database tables, along with the migration of the appropriate access permissions including any security keys.

BRIEF DESCRIPTION OF THE DRAWINGS

Various embodiments of the invention are disclosed in the following detailed description and the accompanying drawings.

DETAILED DESCRIPTION

Figure 1:
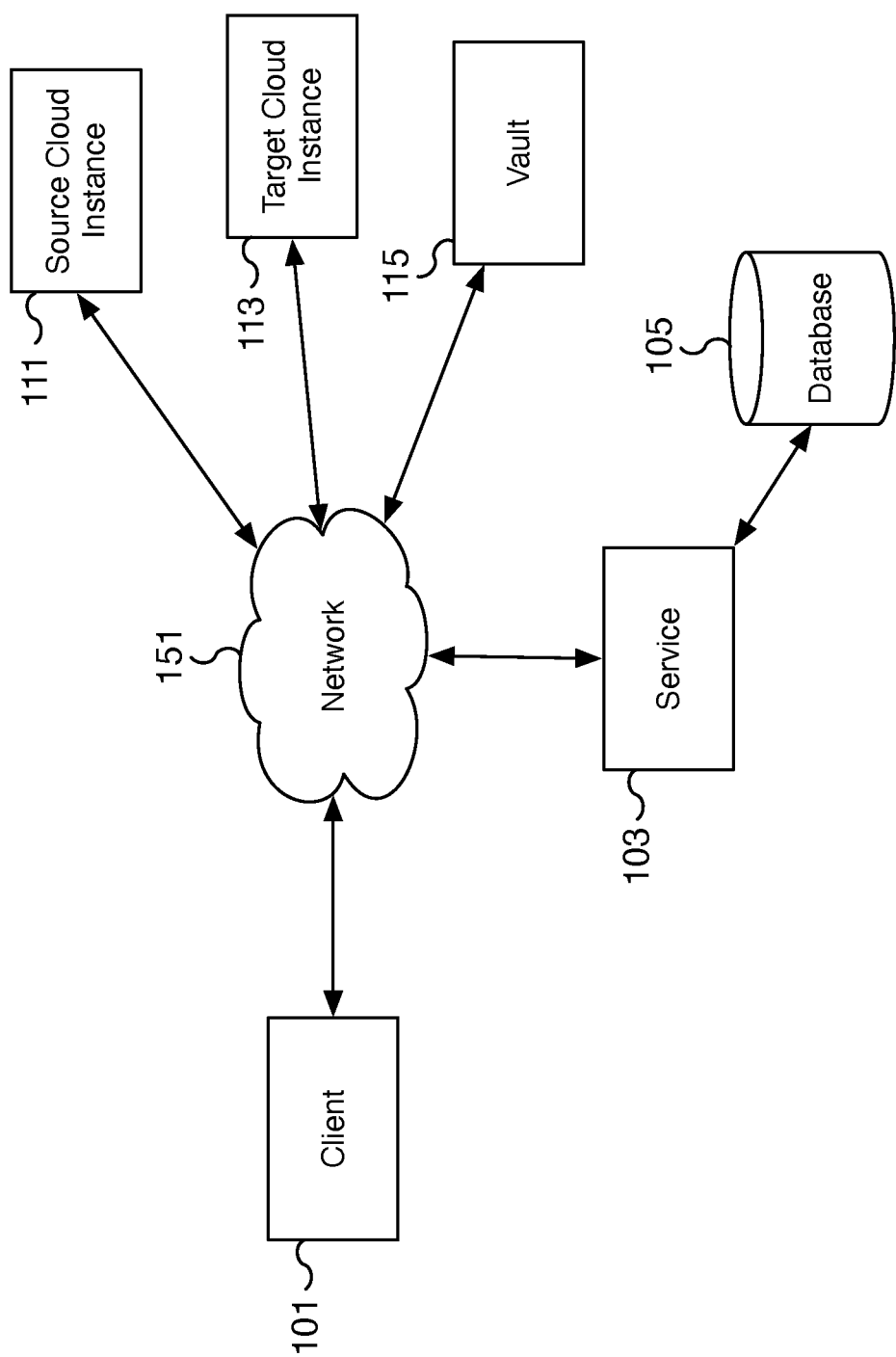
FIG. 1 is a block diagram illustrating an example of a network environment for securely exchanging encryption keys.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The automatic exchange of cryptographic keys is disclosed. Using the techniques described here, the exchange of cryptographic keys between cloud instances can be automated using a key exchange framework. In various embodiments, a target cloud instance can request an encryption key from a source cloud instance. Based on key exchange configurations, the request can be automated to allow the source cloud instance to securely provide the target cloud instance with the requested encryption key. In some embodiments, the key exchange is performed as part of a cloning process. For example, the source cloud instance is cloned to create a target cloud instance. However, the cloning process does not clone or duplicate the encryption keys. Instead, a key exchange process is utilized to request, approve, and transmit the appropriate key used by the source cloud instance to the target instance. In various embodiments, the approval can be automated, for example, by preconfiguring allowed approvals and/or a request can be manually approved. Although in some scenarios the key exchange approval is configured to require manual approval by an administrator for particular types of requests, other portions of the key exchange including the initiating of the key exchange request and the transmission and installation of an exchanged key in response to an approved request can be automated.

In some embodiments, a source cloud instance automatically identifies relevant encryption keys for the instance and can create a key specification for a key exchange request for each identified encryption key. The key exchange specifications for the identified encryption keys can be provided to a target cloud instance, for example, as part of the cloning process. The target cloud instance creates a key exchange request using the provided specifications for any required encryption keys. The request can identify the type of request, the requested encryption key, the cryptographic algorithm used by the key, the source of the encryption key, to whom the requested key should be provided to, identifying information of the requester, a message version number, and/or a shared token, among other information. In some embodiments, a key exchange request is created for each requested key and/or requests for individual keys can be bundled together in a single exchange request.

In various embodiments, once a key exchange request is received, the request can be approved or rejected based on the configured key exchange settings. For example, in some scenarios, an approval frequency is identified for specific key requests as part of the configured key exchange settings. Example approval frequencies can include a one-time approval, a reoccurring approval, a maximum number of allowed approvals, or another appropriate configuration setting. Other key exchange configuration settings can include time-based settings and settings identifying the requester (or target instance). For example, the configured key exchange settings can specify the target instance by IP address, domain name, a shared secret token, and/or another appropriate identifier or technique. In various embodiments, once approved, the requested key is exchanged and provided to the target instance. In some embodiments, the requested key is both signed by the source instance and encrypted with a public key of the target instance. Once the requested key has been received, the target instance can decrypt the data encrypted with the requested key. In some embodiments, the target instance proceeds by generating a new encryption key and rekeying. For example, new data accessed by the target instance and/or existing encrypted data stored at the target instance can be encrypted using the newly generated encryption key. Similarly, in some embodiments, the source instance can perform rekeying after a key exchange. For example, the source instance can generate a new encryption key for improved security. New data accessed by the source instance and/or existing encrypted data stored at the first instance can be encrypted using the newly generated encryption key.

In some embodiments, a cryptographic key is managed for a first instance of a group of one or more cloud nodes providing a service. For example, a cloud instance uses a cryptographic key to securely store and retrieve customer data encrypted using the cryptographic key. The cloud instance can include multiple cloud nodes such as a cluster of cloud servers to provide a cloud-based service relying on the encrypted data. In some embodiments, the cluster includes database servers and/or other data stores for storing encrypted data. In various embodiments, the cryptographic key is managed by the first cloud instance using a key management framework and/or by or using another module, such as a secure hardware key store. A request to share the cryptographic key with a second instance of a different group of one or more cloud nodes is received. For example, the first (or source) cloud instance receives a request from a second (or target) cloud instance to share the cryptographic key used by the first instance with the second instance. In some embodiments, the request is received as part of a process for cloning the first cloud instance to create the second cloud instance. The second cloud instance has a clone of the encrypted data stored at the first cloud instance and requests access to the corresponding cryptographic key in order to access the cloned and encrypted data. In some embodiments, a determination is made whether the second instance is allowed to access the cryptographic key. For example, a key approval engine is configured to accept or deny key exchange requests. The key approval engine can recognize the requester and the requested key and is used to determine whether the second instance is allowed to access the requested cryptographic key. In response to a determination that the second instance is allowed to access the cryptographic key, the cryptographic key is encrypted with a target key of the second instance and signed using a cryptographic signature of the first instance. The signed encrypted cryptographic key is provided to the second instance. For example, an encryption key exchange request made by a second cloud instance is approved and the encryption key is securely transmitted to the second cloud instance from the first cloud instance. The secure transmittal involves encrypting the exchanged encryption key with a public key of the second cloud instance such that only the second cloud instance can decrypt the encryption key by using its corresponding private key and also signing the exchanged encryption key using the cryptographic signature of the first cloud instance such that the second cloud instance can confirm that the exchanged encryption key is sourced from the first cloud instance.

FIG. 1 is a block diagram illustrating an example of a network environment for securely exchanging encryption keys. In the example shown, client 101, service 103, source cloud instance 111, target cloud instance 113, and vault 115 are communicatively connected via network 151. Network 151 can be a public or private network. In some embodiments, network 151 is a public network such as the Internet. In some embodiments, source cloud instance 111, target cloud instance 113, and vault 115 are on a private local network separate from client 101 and/or service 103. In the example shown, service 103 is communicatively connected to database 105. Service 103 and database 105 may be on the same network and/or hosted in the same datacenter or connected via another topology than the one shown. Service 103 utilizing database 105 hosts cloud services such as a web application for configuring key exchanges between cloud instances and/or deploying and/or cloning new cloud instances. In various embodiments, these services can be accessed via a client such as client 101. In some embodiments, service 103 hosts configuration management database (CMDB) services. Additional services provided by service 103 can include resource discovery, resource management, event management, cloud management, maintenance, and compliance services, among others. In the various scenarios, database 105 can be utilized to store data related to the cloud-hosted services offered by service 103. Although not shown, in some embodiments, service 103 and/or database 105 is implemented at least in part in each instance of a cloud service, such as part of both source cloud instance 111 and target cloud instance 113. For example, a key exchange service that is part of service 103 can be offered directly by a cloud instance such as source cloud instance 111 and/or target cloud instance 113. In various embodiments, a user connects to a key exchange service offered by source cloud instance 111 to configure key exchange settings for securely deploying encryption keys from source cloud instance 111 to an approved target cloud instance such as target cloud instance 113.

In some embodiments, client 101 may include a web browser that is utilized by an administrator of an organization to access service 103, source cloud instance 111, and/or target cloud instance 113 for managing the exchange of security keys used by cloud instances. Service 103 is a network-accessible service such as a web accessible service that provides a user interface for client 101 and its administrator. In some embodiments, service 103 is used to clone a cloud instance, for example, to create a cloud instance such as target cloud instance 113 from a source cloud instance such as source cloud instance 111. The created cloud instance can be used for development, testing, staging, resource scaling, and/or one of many other reasons. During the cloning processes, portions of the software and/or hardware configuration of the source cloud instance, such as source cloud instance 111, are replicated to a target cloud instance, such as target cloud instance 113. Although encrypted data stored at the source instance can be replicated at the target instance, for improved security, the security keys utilized by the source instance are not transferred as part of the cloning process. For the target instance to decrypt and access the cloned encrypted data, the target instance needs to import the appropriate security keys. Using the techniques disclosed herein, a key exchange can be securely performed in an automated manner.

In various embodiments, a target cloud instance such as target cloud instance 113 initiates a key exchange request to a source cloud instance such as source cloud instance 111. The key exchange request is a message requesting that the source instance share one or more encryption keys. In the event the key exchange request is approved, the relevant keys are exchanged and provided to target cloud instance 113. In some embodiments, the access policy is preconfigured via client 101. For example, the access policy can be configured to allow only a one-time approval of a key exchange request. As another example, the access policy can be configured to allow automated reoccurring approvals for requests. In some embodiments, the access policy is configured to require a manual request. Other access policies as well as combinations of key exchange settings can be appropriate as well. In various embodiments, vault 115 is used to securely store security keys. For example, vault 115 can be a hardware key store used to securely store one or more encryption keys. In some embodiments, vault 115 is used to provide public keys corresponding to private keys of source cloud instance 111 and target cloud instance 113. The private keys of source cloud instance 111 and target cloud instance 113 are securely stored by their respective cloud instances and may also utilize vault 115 as appropriate. In some embodiments, multiple keys are utilized for improved security and multiple layers of keys can be utilized to process an encryption key using one or more other keys. For example, data encryption keys can be stored locally at each cloud instance and key encryption keys can be stored at vault 115. Other encryption schemes are appropriate as well and are applicable to the disclosed techniques.

In various embodiments, each cloud instance such as source cloud instance 111 and target cloud instance 113 can include a cluster of one or more servers (or nodes). The included servers can include application servers, data store servers such as database servers, load balancers, and/or other component nodes. In some embodiments, each cloud instance includes a key management framework for managing the exchange of security keys including the importing and/or exporting of keys and the creation and/or approval of key exchange requests. In some embodiments, each instance also includes one or more data stores (not shown) for tracking key exchange requests and accessing policies for responding to key exchange requests.

In various embodiments, the components shown in FIG. 1 may exist in various combinations of hardware machines. Although single instances of components have been shown to simplify the diagram, additional instances of any of the components shown in FIG. 1 may exist. For example, service 103 may include one or more cloud-based servers. Similarly, database 105 may not be directly connected to service 103 and/or may be replicated or distributed across multiple components. As another example and as described above, portions of service 103 and database 105 may be implemented as part of each cloud instance. In some embodiments, components not shown in FIG. 1 may also exist.

Figure 2:
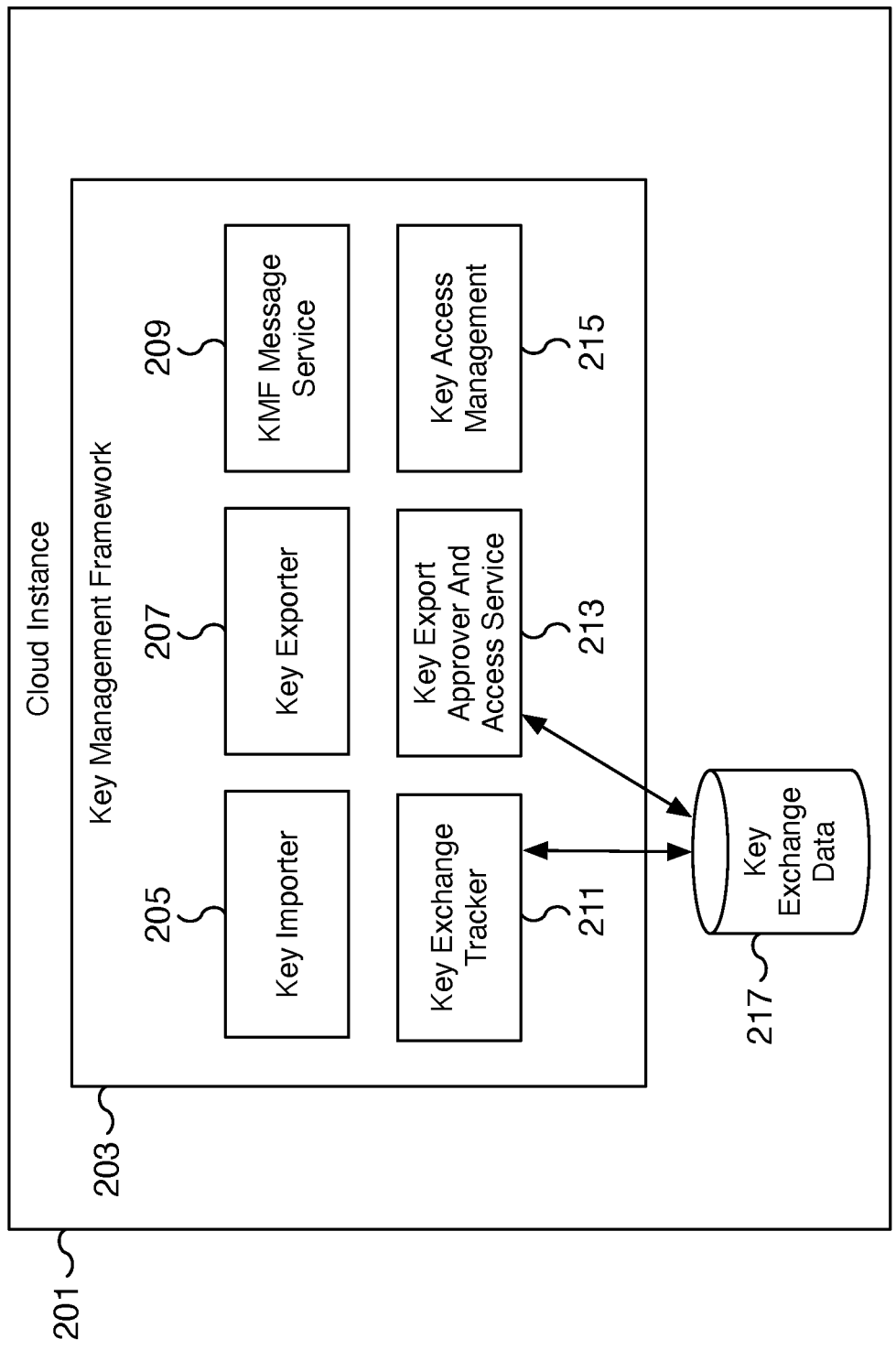
FIG. 2 is a block diagram illustrating an example of a key management framework of a cloud instance utilized for securely exchanging encryption keys.

FIG. 2 is a block diagram illustrating an example of a key management framework of a cloud instance utilized for securely exchanging encryption keys. In the example shown, cloud instance 201 includes key management framework 203 and key exchange data 217. Key management framework 203 includes components key importer 205, key exporter 207, key management framework (KMF) message service 209, key exchange tracker 211, key export approver and access service 213, and key access management 215. Cloud instance 201 includes additional components not shown. In various embodiments, cloud instance 201 is a cluster of servers or nodes and key management framework 203 runs on one or more of the node servers of cloud instance 201. Similarly, key exchange data 217 may be hosted on one or more database servers or data servers of cloud instance 201. In various embodiments, both source and target cloud instances for respectively providing and requesting a key include key management framework 203 and key exchange data 217. In some embodiments, cloud instance 201 is source cloud instance 111 and/or target cloud instance 113 of FIG. 1. In some embodiments, key management framework 203 is utilized by service 103 of FIG. 1 and key exchange data 217 is hosted at database 105 of FIG. 1 for securely exchanging encryption keys. In various embodiments, cloud instance 201 is connected to a network such as network 151 of FIG. 1 via a network connection (not shown). For example, in some embodiments, cloud instance 201 can access a key vault such as vault 115 of FIG. 1 to retrieve public keys for message authentication and wrapping encryption keys.

In some embodiments, the components of key management framework 203 are replicated on both source and target cloud instances but each of the components of key management framework 203 can contain functional portions relevant only to exporting or importing encryption keys. The source cloud instance functionality corresponds to approving/rejecting a key exchange request, exporting an approved key, and providing an approved encryption key for sharing. The target cloud instance functionality corresponds to initiating a key exchange request and importing or installing a received requested encryption key based on an approved request. In some embodiments, key importer 205 is utilized by a target cloud instance to request and import security keys from a key source, such as a source cloud instance. Key importer 205 can create a key exchange request based on an encryption key exchange specification. In contrast, key exporter 207 is utilized by a source cloud instance to accept a key exchange request and extract the corresponding keys from a key repository. The key repository can be local to the source cloud instance or stored remotely, such as in a key vault. In some embodiments, key management framework (KMF) message service 209 provides a secure channel for sending key exchange requests and responses between source and target cloud instances. For example, a key exchange response message can include a key exchange request directed to a source target instance that is signed by the target cloud instance. As another example, a key exchange response message can include a signed and encrypted encryption key that has been approved and is intended for sharing at a target cloud instance. Key management framework (KMF) message service 209 can support authentication, for example, by using the sender's private key and encryption, for example, by using the receiver's public key. In various embodiments, corresponding instances of key management framework (KMF) message service 209 on source and target cloud instances operate as corresponding ends of a secure communication channel.

In some embodiments, key exchange tracker 211 is utilized to track key exchange requests. For example, certain requests can be configured as one-time requests and key exchange tracker 211 can be utilized to track/query how many requests of a particular specification have been received. In various embodiments, key exchange tracker 211 tracks both pending, approved, and rejected requests. Additional data such as the requesting cloud instance, requested key type, requested key encryption, and other key exchange data can be tracked by key exchange tracker 211. In some embodiments, key export approver and access service 213 is utilized to approve or reject received key exchange requests based on configured key exchange settings including key exchange access policies. Key export approver and access service 213 can also track approvals and rejections based on key exchange settings including why certain requests were rejected. For example, an administrator can access key management framework 203 to review past approved and rejected requests utilizing key export approver and access service 213 and/or key exchange tracker 211. In the example shown, both key exchange tracker 211 and key export approver and access service 213 access key exchange data 217. In some embodiments, key exchange data 217 is implemented as one or more tables such as database tables hosted by cloud instance 201. Key exchange data 217 can be utilized by one or more components of key management framework 203 such as key exchange tracker 211 and/or key export approver and access service 213 for storing key exchange requests, key specifications, access policies, and/or other key exchange data such as key exchange configuration settings.

In some embodiments, key access management 215 is utilized to manage access to encryption keys including local access to keys such as instance data encryption keys. For example, key access management 215 may be used by key exporter 207 to access a requested encryption key corresponding to an approved key exchange request. As another example, key access management 215 may be used by key importer 205 to store an imported encryption key received in response to a key exchange request. In some embodiments, key access management 215 is utilized for managing the process of generating new keys, including new key pairs, and may utilize an external key vault, for example, for managing centrally located keys.

Figure 3:
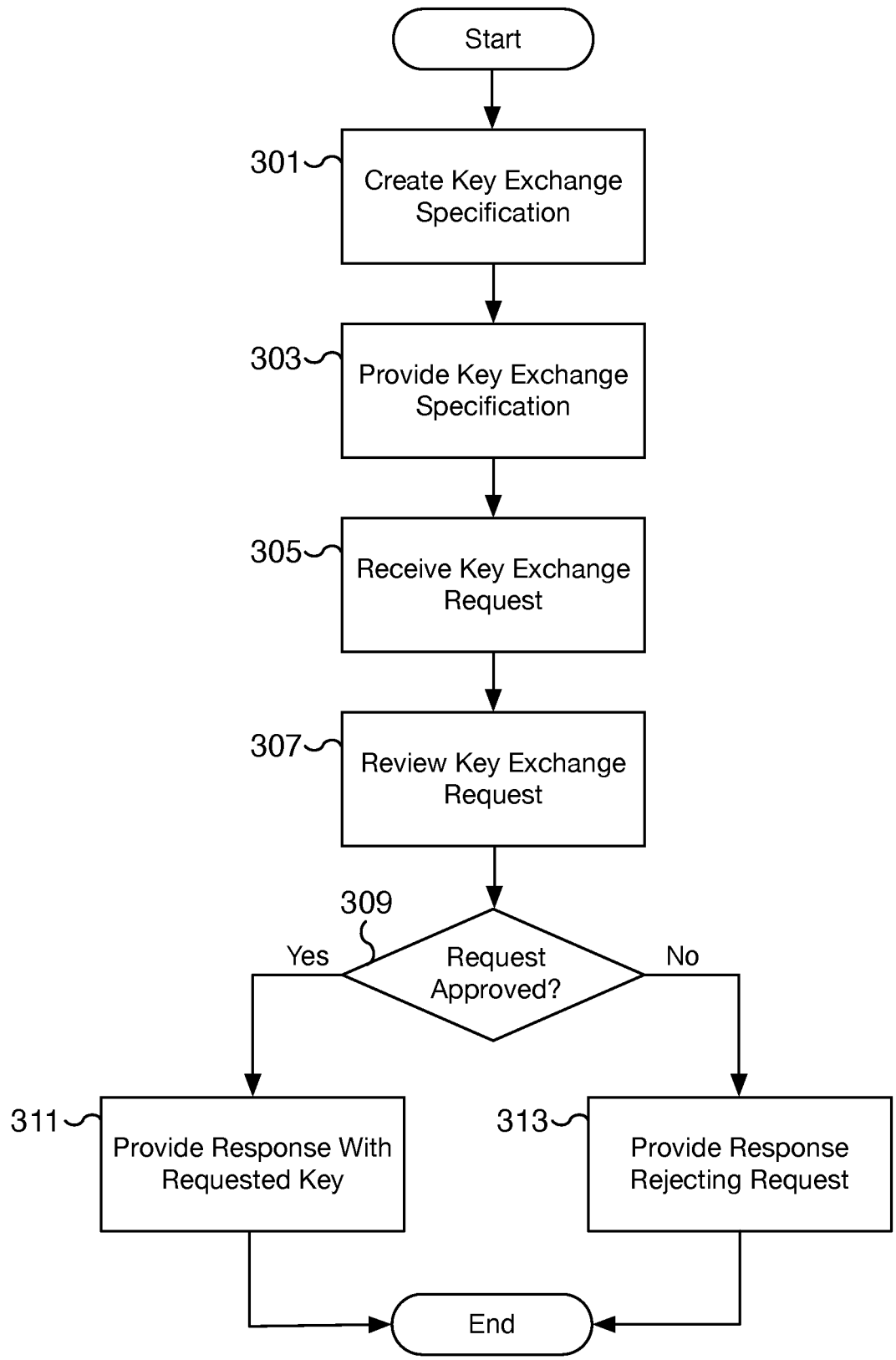
FIG. 3 is a flow chart illustrating an embodiment of a process for securely deploying an encryption key to a target cloud instance.

FIG. 3 is a flow chart illustrating an embodiment of a process for securely deploying an encryption key to a target cloud instance. In various embodiments, the process of FIG. 3 can be used to create a specification for and respond to a key exchange request. Target cloud instances can utilize the key exchange specification to provide a key exchange request based on the specification. The source instance is configured with key exchange parameters including access policies that determine whether to approve or reject incoming key exchange requests. In some embodiments, the process is implemented at least in part by a key management framework running on the source and target cloud instances. In various embodiments, the process of FIG. 3 is performed by a source cloud instance such as source cloud instance 111 of FIG. 1 and/or by a cloud service such as service 103 of FIG. 1. In some embodiments, a key management framework, such as key management framework 203 of FIG. 2, is used to perform the process of FIG. 3.

At 301, a key exchange specification is created. For example, a source cloud instance is analyzed to identify installed security keys and one or more key exchange specifications are created for each of the identified keys. The specification can include the encryption key type, encryption key cipher, and identifying information of the source cloud instance such as the source hostname and/or system identifier. In various embodiments, a key exchange specification includes a secret token, random number, timestamp, or another appropriate security implementation used at least in part to identify the authenticity of the key exchange specification. For example, a key exchange request must include at least the secret token of the source cloud instance in order for the request to be considered a valid request independent of whether the request should be approved. In some embodiments, the key exchange specification is created at least in part by utilizing a key access management component of a key management framework, such as key access management 215 of FIG. 2.

At 303, a key exchange specification is provided. For example, a key exchange specification is made available to target cloud instances. The created key exchange specification may be pushed to target cloud instances. In some embodiments, the specification is retrieved via a user interface for managing key deployments. For example, an administrator via a client, such as client 101 of FIG. 1, can manage and control the distribution of key exchange specifications to target cloud instances. In some embodiments, the relevant key exchange specifications are automatically installed on a target instance as part of a cloning process. For example, the corresponding key exchange specifications for the required keys necessary to access cloned encrypted data are installed on the target cloud instance.

At 305, a key exchange request is received. For example, a key exchange request is received from a target cloud instance. In various embodiments, the key exchange request is created from a key exchange specification. In some embodiments, the message of the key exchange request includes a single request or multiple key requests. Each requested key can specify the requested key along with additional identifying information, such as the information used to determine the appropriate key and whether the target cloud instance should be granted access to the requested key. In some embodiments, the received request is received as part of a signed request message. In some embodiments, the message is received using a key management framework message service of a key management framework, such as key management framework message service 209 of FIG. 2.

At 307, the key exchange request is reviewed. For example, the request is analyzed to determine whether the request is a valid request and whether the request should be approved or rejected. In some embodiments, a shared token or other security implement is verified. In some embodiments, the received request is received as part of a signed request message and the request signature is verified. Once reviewed, the request is allowed or rejected. In various embodiments, the request is tracked along with the determination of whether the request was allowed or rejected. In some embodiments, the key request is reviewed using a key export approver and access service component of a key management framework, such as key export approver and access service 213 of FIG. 2, and the request is tracked using a key exchange tracker component of a key management framework, such as key exchange tracker 211 of FIG. 2. In some embodiments, the tracking data of the request is stored as part of key exchange data such as key exchange data 217 of FIG. 2.

In some embodiments, the request is decoded to determine parameters of the request such as parameters of the target instance requesting the key and parameters of the requested key. Additional decoded parameters can include parameters associated with the source instance, for example, to confirm the key exchange request is valid. Once the key request parameters are confirmed, the access policy associated with the request is evaluated. Based on configured access policies, the request may be approved or rejected. For example, access policies can include an exchange frequency parameter to determine how many requests of a particular type should be allowed. In some embodiments, the request may be associated with a one-time approval and subsequent requests of the same type are rejected. The request may also be associated with a time limit or condition that a request must meet to be approved, such as a maximum number of allowed requests and/or allowing all reoccurring requests of a particular type to be approved. In some embodiments, access control lists are used to determine whether the requester is allowed access to the requested key. The various access policies can be configured for an automated approval of received requests and/or require an administrator to manually approve each received request. In some embodiments, automated approvals are preconfigured approvals, such as a pre-approval, of one or more requests that match a particular request type.

At 309, a determination is made whether the key exchange request is approved. In the event the key exchange request is approved, processing proceeds to 311. In the event the key exchange request is not approved, processing proceeds to 313.

At 311, a response with the requested key is provided. In various embodiments, an approval response is created that includes the requested key and the response is transmitted to the requester. In some embodiments, the requested key is encrypted, for example, using a public key of the target cloud instance. The response message can also be signed, for example, by using the private key of the source cloud instance. In some embodiments, the response message includes a shared token used at least in part to match the approval response to the request received at 305. In various embodiments, the creation of the approval response involves accessing the requested key and exporting the key from a secure store. In some embodiments, the creation of the approval response involves utilizing a key access management component of a key management framework, such as key access management 215 of FIG. 2 and a key exporter component of a key management framework, such as key exporter 207 of FIG. 2. The response message can be sent using a key management framework message service of a key management framework, such as key management framework message service 209 of FIG. 2. In some embodiments, the signing and encryption of the approval response message involves accessing appropriate keys via a key access management component of a key management framework, such as key access management 215 of FIG. 2.

In some embodiments, once a key is shared and provided as part of a response to a key exchange request, additional post-processing can be performed such as rekeying. For example, existing encrypted data can be decrypted using the newly shared key and then re-encrypted using a newly generated key. In some embodiments, a newly generated key is used to encrypt only new data and only existing data already encrypted using the newly shared key continues to use the newly shared key.

At 313, a response rejecting the key exchange request is provided. In various embodiments, a rejection response is created that does not include the requested key and the rejection response is transmitted to the requester. The rejection response message can be signed, for example, by using the private key of the source cloud instance. The response message can also include a shared token used at least in part to match the rejection response to the request received at 305. The response message can be sent using a key management framework message service of a key management framework, such as key management framework message service 209 of FIG. 2. In some embodiments, the signing and encryption of the rejection response message involves accessing appropriate keys via a key access management component of a key management framework, such as key access management 215 of FIG. 2.

Figure 4:
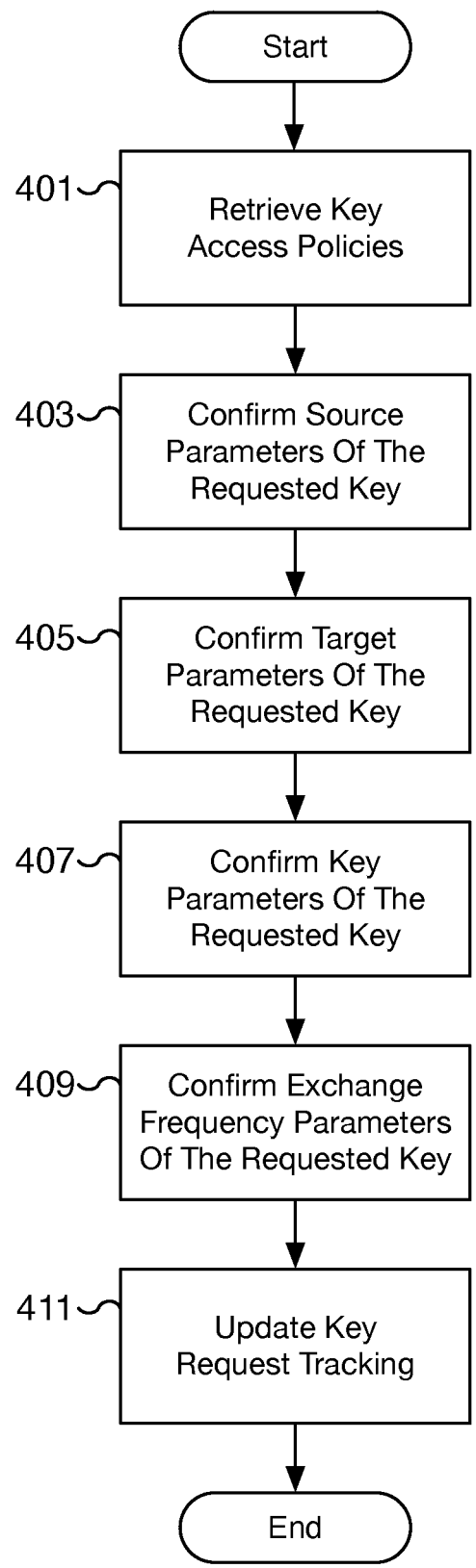
FIG. 4 is a flow chart illustrating an embodiment of a process for analyzing a key exchange request.

FIG. 4 is a flow chart illustrating an embodiment of a process for analyzing a key exchange request. In various embodiments, the process of FIG. 4 can be used to determine whether to approve a key exchange request. For example, only by successfully completing the process of FIG. 4 is a key exchange request approved. Failure to complete each step of FIG. 4 can result in the rejection of a key exchange request. Although the process of FIG. 4 is shown with a certain number of steps, additional or fewer confirmation steps may be appropriate as well. For example, in some embodiments, fewer or additional confirmation parameters may be required to approve a key exchange request. In some embodiments, the process of FIG. 4 is performed by a source cloud instance such as source cloud instance 111 of FIG. 1 in response to receiving a key exchange request. In various embodiments, the process of FIG. 4 can be performed on behalf of a source cloud instance at a cloud service such as cloud service 103 of FIG. 1 using one or more components of a key management framework, such as key management framework 203 of FIG. 2. The key management framework may utilize multiple components of the framework including a key exporter component, such as key exporter 207 of FIG. 2, for performing the steps of FIG. 4. In some embodiments, the process of FIG. 4 is performed at 307 of FIG. 3 in response to a key exchange request received at 305 of FIG. 3.

At 401, key access policies are retrieved. For example, access control policies specifying users and/or machines that can access the requested key are retrieved. The access policies can include an approval frequency associated with a request. For example, a key exchange request pre-approval can be valid for a single request, multiple requests, or all (reoccurring) requests. In some embodiments, the key access policies can also specify the time frame for which a request is valid, whether post-processing tasks such as rekeying should be performed in response to a request (such as when a key is shared and/or rejected), whether a request requires manual approval, and/or another appropriate access configuration. In various embodiments, key access policies are retrieved using a key export approver and access service component such as key export approver and access service 213 of FIG. 2. The access policies may be stored and retrieved from key exchange data such as key exchange data 217 of FIG. 2.

At 403, source parameters of the requested key are confirmed. For example, the source cloud instance with the request key is confirmed to match the key source information included in the key exchange request. In some embodiments, the key exchange request includes one or more system identifiers of the key source. The one or more source parameters included in the key exchange request are confirmed, for example, to ensure the key request exchange is directed to the correct key source. Additional examples of source parameters include the source hostname, the source network address, a source shared secret token, a source shared timestamp, a source shared random number, or another source secret identifier, among others. In various embodiments, the access policies of the source cloud instance include particular parameters of the source cloud instance that must match the source parameters of the key exchange request in order to approve the request.

At 405, target parameters of the requested key are confirmed. For example, the target cloud instance making the request to share a key is confirmed to match retrieved access policies. In some embodiments, the target parameters included in the key exchange request identify information of the target cloud instance, such as the target hostname, network address, user accounts, etc. The target parameters may also include a secret token or similar security implement associated with the target cloud instance. In various embodiments, the access policies retrieved at 401 specify particular parameters of the target that must match the target parameters of the key exchange request in order to approve the request.

At 407, key parameters of the requested key are confirmed. For example, the key parameters specified in the key exchange request are confirmed to match available keys approved for exchanging based on the access policies. In some embodiments, the key parameters included in the key exchange request specify key information such as the particular key requested, the key type, the key cipher, and/or additional cryptographic specifications of the requested key, among other key parameters. In some embodiments, key parameters are configured as part of the access policy retrieved at 401. For example, a key active flag can be configured to allow a key to be actively shared upon approval or disabled to prevent sharing. In various embodiments, the access policies retrieved at 401 specify particular parameters of available keys for sharing that must match the key parameters of the key exchange request in order to approve the request.

At 409, exchange frequency parameters of the requested key are confirmed. For example, an access policy for a request key can include an exchange frequency parameter. The exchange frequency parameter can limit the request for sharing a key to a single key exchange request instance. Subsequent key exchange requests matching the initial request or access policy will be rejected. In some embodiments, the exchange frequency parameter can be configured to allow multiple matching requests to be approved, thus allowing reoccurring requests to be automatically approved. For example, in the event an exchanged key expires at the target source instance, a subsequent request for the same key may be approved based on the configured exchange frequency parameter for the request or access policy. Additional exchange frequency parameter configurations may include a maximum number of allowed requests for a matching key exchange request or access policy and/or time limit conditions for allowing a request, among other exchange frequency parameter configurations. In various embodiments, the access policies retrieved at 401 specify particular exchange frequency parameters of available keys for sharing that must match the key exchange request in order to approve the request.

At 411, key request tracking is updated. For example, the request and the analysis performed at each step of FIG. 4 can be tracked and the tracking data is updated. In various embodiments, each key exchange request and corresponding approval or rejection is tracked along with information related to request analysis such as why a request was rejected. In various embodiments, metrics associated with requests such as request count, approval count, and/or rejection count are tracked for each requested or available key. The metrics can be made available for an administrator to review and can be used for access policy decisions. For example, approval counts for a key can be tracked to enforce exchange frequency parameters. In various embodiments, the target source instance information is also stored for each tracked request and corresponding response along with information related to the time of the request. In various embodiments, tracking information is tracked using a key exchange tracker component of a key management framework, such as key exchange tracker 211 of FIG. 2. In some embodiments, the tracking data of the request and corresponding response is stored as part of key exchange data such as key exchange data 217 of FIG. 2.

Figure 5:
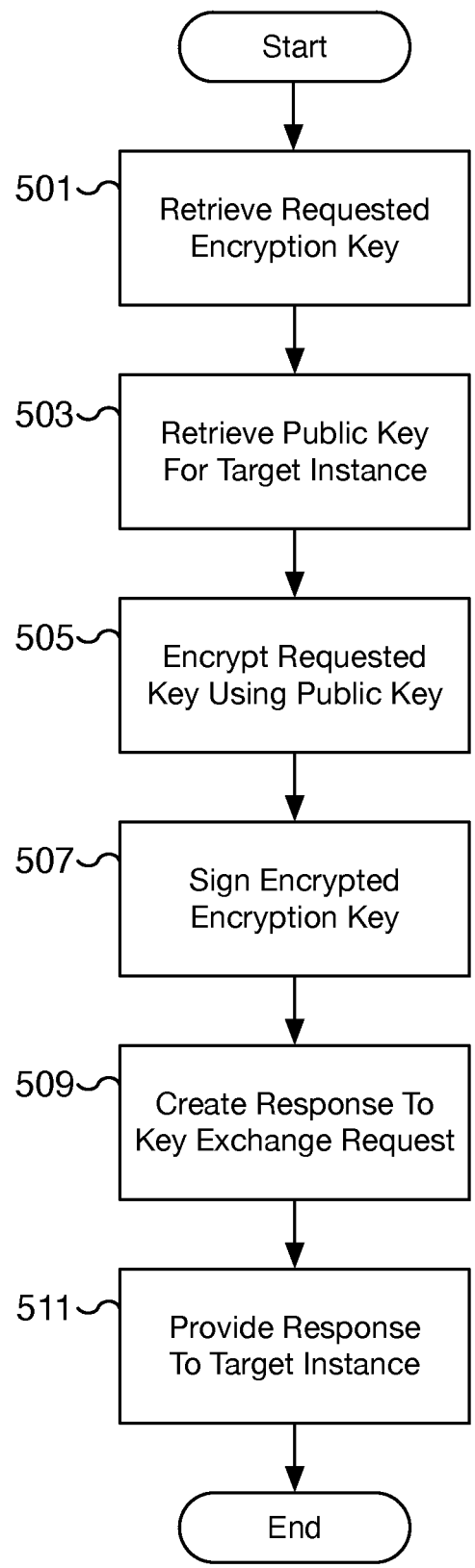
FIG. 5 is a flow chart illustrating an embodiment of a process for providing an encryption key associated with an approved key exchange request.

FIG. 5 is a flow chart illustrating an embodiment of a process for providing an encryption key associated with an approved key exchange request. In various embodiments, the process of FIG. 5 can be used to prepare a response for an approved key exchange request that includes the requested key. In some embodiments, the key exchange request is approved at step 307 of FIG. 3 and/or using the process of FIG. 4. In some embodiments, the process of FIG. 5 is performed at 311 of FIG. 3 in response to an approved request. In some embodiments, the process of FIG. 5 is performed by a source cloud instance such as source cloud instance 111 of FIG. 1 to create a response for a target cloud instance such as target cloud instance 113 of FIG. 1. In various embodiments, the process of FIG. 5 can be performed on behalf of a source cloud instance at a cloud service such as cloud service 103 of FIG. 1 using one or more components of a key management framework, such as key management framework 203 of FIG. 2, including a key exporter component, such as by key exporter 207 of FIG. 2, and a key access management component such as key access management 215 of FIG. 2.

At 501, a requested encryption key is retrieved. For example, the request key is retrieved from a key store. The key store may be a local and/or remote key store, such as vault 115 of FIG. 1. In some embodiments, the encryption key is encrypted and must first be decrypted. For example, the step of 501 may require retrieving multiple keys such as a key encryption key in addition to the requested encryption key. In various embodiments, the requested encryption key is retrieved using a key access management component such as key access management 215 of FIG. 2.

At 503, the public key for the target cloud instance is retrieved. For example, the public key of the requesting target cloud instance is retrieved using a key access management component such as key access management 215 of FIG. 2. In various embodiments, the public key is confirmed to be a valid public key associated with the target cloud instance.

At 505, the requested key is encrypted using the public key. For example, utilizing the public key retrieved at 503, the requested encryption key retrieved at 501 is encrypted. In some embodiments, additional data of the response may be encrypted as well. By utilizing the public key of the target cloud instance, the corresponding private key of the target cloud instance can be utilized to decrypt the encrypted encryption key.

At 507, the encrypted encryption key is signed. For example, message data for a response to the approved key exchange request that includes the encryption key encrypted at 505 is signed. In some embodiments, the message data is signed using a private key of the source cloud instance. In various embodiments, the signature can be verified by the target cloud instance by using the corresponding public key of the source cloud instance.

At 509, a response to the key exchange request is created. For example, a response message is created using a message payload that includes the requested encryption key encrypted at 505 and the corresponding signature created at 507. In various embodiments, the response message also includes a response message header. The header is populated with the appropriate message header values. For example, header fields can include a "from" field for the source cloud instance identifier, a "to" field for the target cloud instance identifier, an expiration time, an issue time, one or more security tokens such as one or more shared random numbers, a message description, a message format type, a message version number, a key identifier, and a cryptography algorithm identifier, among other fields. In various embodiments, additional or fewer fields may be appropriate.

At 511, the response is provided to the target cloud instance. For example, the response created at 509 is provided to the target cloud instance via a network connection. In some embodiments, the response is provided using a secure connection. The message handling can be performed using a key management framework message service of a key management framework, such as key management framework message service 209 of FIG. 2.

Figure 6:
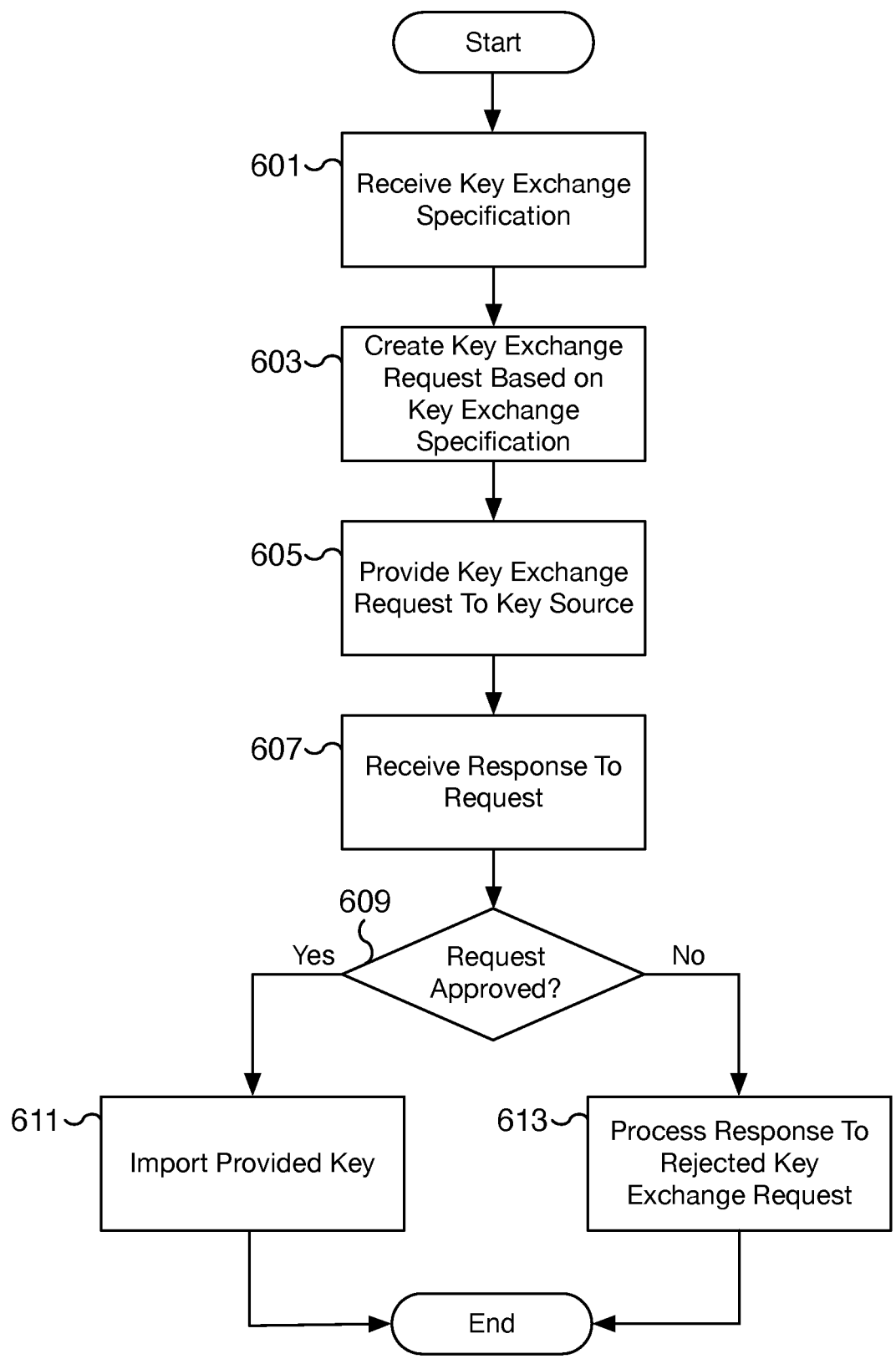
FIG. 6 is a flow chart illustrating an embodiment of a process for securely receiving an encryption key at a target cloud instance.

FIG. 6 is a flow chart illustrating an embodiment of a process for securely receiving an encryption key at a target cloud instance. In various embodiments, the process of FIG. 6 can be used to initiate the sending of a key exchange request from a target cloud instance for receiving the requested key from a source cloud instance. The key exchange request can be created based on a key exchange specification provided to the target cloud instance. In some embodiments, the process is implemented at least in part by a key management framework running on the source and target cloud instances. In various embodiments, the process of FIG. 6 is performed by a target cloud instance such as target cloud instance 113 of FIG. 1 and/or initiated via a cloud service such as service 103 of FIG. 1. In some embodiments, a key management framework, such as key management framework 203 of FIG. 2, is used to perform the process of FIG. 6.

At 601, a key exchange specification is received. For example, one or more key exchange specifications are made available at target cloud instances. The specifications may be pushed to the target instance, for example, by a cloud management/deployment service and/or as part of a cloning process. In some embodiments, a key exchange specification is provided to a target cloud instance by an administrator via a user interface for managing key deployments. In some embodiments, the key exchange specification is installed on a target instance as part of a cloning process. In various embodiments, multiple key exchange specifications are received, and the ones received are the ones required by the target cloud instance for accessing encrypted data. A key exchange specification can describe the required security key including the key type and cipher, the identity of the key source to whom the key request should be sent, and one or more security measures, such as a required shared token that may be required when creating a key exchange request key. For example, a secret token, random number, timestamp, or another appropriate security implement may be described by the key exchange specification and must be included in the corresponding key exchange request for the request to be valid. In some embodiments, the key exchange specification is received by a key importer component of a key management framework, such as key importer component 205 of FIG. 2. In some embodiments, the specification is part of a message received via a key management framework message service of a key management framework, such as key management framework message service 209 of FIG. 2.

At 603, a key exchange request is created based on the received key exchange specification. For example, a key exchange request is created to specify the requested key along with additional information such as information to verify the request and information to provide a destination for the key request response. In various embodiments, the request may include a description of the required key, the identity of the key source, such as a system identifier of the source cloud instance, and security tokens or other security implements to validate the request. For example, the key exchange request may include one or more shared secret tokens. The shared tokens can be generated by the source and/or target cloud instances. For example, a secret token generated by the source cloud instance and included in the key exchange request helps to confirm that the target cloud instance has a valid key exchange specification. In contrast, a secret token generated by the target cloud instance, included in the key exchange request, and also included by the source cloud instance in its response to the key exchange request helps to confirm that the response to the target cloud instance is a valid response to the key exchange specification. In some embodiments, the key exchange request is a signed request message. In some embodiments, the key exchange request is created at least in part by using a key importer component of a key management framework, such as key importer component 205 of FIG. 2.

At 605, the key exchange request is provided to the key source. For example, the key exchange request created at 603 is transmitted to the key source, such as a source cloud instance. In various embodiments, the key source is determined by the key exchange specification received at 601. The key exchange request can be provided as part of a signed key exchange request message. In some embodiments, the message is provided to the key source using a key management framework message service of a key management framework, such as key management framework message service 209 of FIG. 2. In some embodiments, the message is signed and/or encrypted by accessing the appropriate keys via a key access management component of a key management framework, such as key access management 215 of FIG. 2. In various embodiments, the key source is the source cloud instance with the installed requested key. In some embodiments, the request is routed to a service such as service 103 of FIG. 1 and/or directly to the source cloud instance such as source cloud instance 111 of FIG. 1. In some embodiments, created and provided key exchange requests are tracked. For example, every request created and/or provided is tracked and metadata associated with the request is saved and can be reviewed. The saved data can be used to match outstanding/pending requests to incoming responses and/or reviewed by an administrator, for example, via a user interface client. The associated key exchange request can be tracked using a key exchange tracker component of a key management framework, such as key exchange tracker 211 of FIG. 2. In some embodiments, the tracking data of the request is stored as part of key exchange data such as key exchange data 217 of FIG. 2.

At 607, a response to the key exchange request is received. For example, a response corresponding to the key exchange request provided at 605 is received. The source of the response can be the source cloud instance with the requested key. In various embodiments, the response includes a determination regarding whether the corresponding request was approved. In the event the response was approved, the response includes the requested key and the response can be further decoded at 611. In various embodiments, the response is a signed response and is verified, for example, by at least in part examining the signature of the signed response message, examining the source of the response, and/or confirming a shared security implement such as a shared secret token. In some embodiments, the message is received and processed at least in part by a key management framework message service of a key management framework, such as key management framework message service 209 of FIG. 2. The appropriate keys required to authenticate and/or decrypt the message may be accessed via a key access management component of a key management framework, such as key access management 215 of FIG. 2. In some embodiments, the request is examined by a key importer component of a key management framework, such as key importer component 205 of FIG. 2.

At 609, a determination is made whether the key exchange request was approved. In the event the key exchange request was approved, processing proceeds to 611. In the event the key exchange request was not approved, processing proceeds to 613.

At 611, the provided requested key is imported. For example, the key requested as part of the request provided at 605 is extracted from the response received at 607. In some embodiments, the requested key is encrypted and is first decrypted into a clear key before being imported into the target cloud instance. In various embodiments, the received key is processed by a key importer component of a key management framework, such as key importer component 205 of FIG. 2. The key can be secured into a local key store and/or a remote key store by a key access management component of a key management framework, such as key access management 215 of FIG. 2. For example, the key can be further encrypted using a key encryption key at the target cloud instance. In some embodiments, once the key is imported, additional post-processing can be performed such as rekeying. For example, existing encrypted data can be decrypted using the newly shared key and then re-encrypted using a newly generated key. In various embodiments, the approval response is tracked and associated with the request using a key exchange tracker component of a key management framework, such as key exchange tracker 211 of FIG. 2. In some embodiments, the tracking data of the approval response is stored as part of key exchange data such as key exchange data 217 of FIG. 2.

At 613, the response to the rejected key exchange request is processed. For example, the request provided at 605 resulted in a corresponding response received at 607 that is a rejection of the key exchange request. In various embodiments, the rejection is logged, and a notification can be created, for example, to email an administrator of the key request rejection. In some embodiments, a new request is created based on the response that includes additional information provided in the response, such as requesting a revised key. For example, the new request can be created by repeating or using a process such as the process of FIG. 6 with an updated key exchange specification (not shown). In various embodiments, the rejection is tracked and associated with the request using a key exchange tracker component of a key management framework, such as key exchange tracker 211 of FIG. 2. In some embodiments, the tracking data of the rejection response is stored as part of key exchange data such as key exchange data 217 of FIG. 2.

Figure 7:
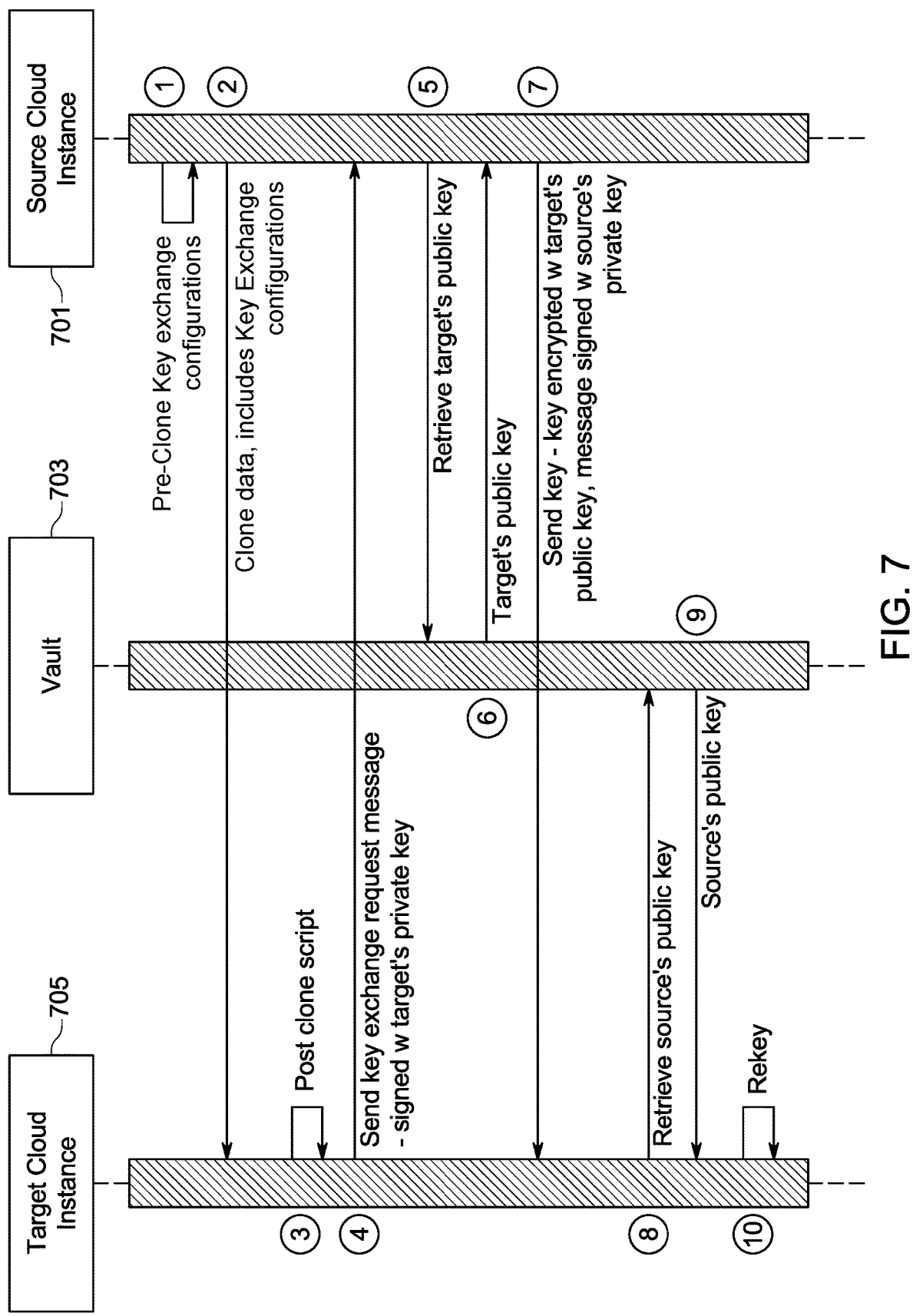
FIG. 7 is a diagram illustrating the process for automating the secure exchange of encryption keys between cloud instances.

FIG. 7 is a diagram illustrating the process for automating the secure exchange of encryption keys between cloud instances. The diagram of FIG. 7 illustrates the interactions of different components of a network environment for automating the secure exchange of encryption keys between cloud instances in a scenario where the source cloud instance is cloned to create a target cloud instance. The example of FIG. 7 shows an approved key exchange request. Although the automated key exchange is shown in the context of cloning, the process of automating the exchange of keys is applicable to other scenarios as well. In the example shown, the components of FIG. 7 include source cloud instance 701, vault 703, and target cloud instance 705 and are communicatively connected. In some embodiments, source cloud instance 701 is source cloud instance 111 of FIG. 1, vault 703 is vault 115 of FIG. 1, and target cloud instance 705 is target cloud instance 113 of FIG. 1. In some embodiments, the cloning and key exchange configuration is configured via a client such as client 101 of FIG. 1.

At step 1 of FIG. 7, pre-clone key exchange configurations are performed. In various embodiments, the configuring of pre-clone key exchange configurations includes the creation of key exchange specifications for keys installed on source cloud instance 701. In some embodiments, the pre-clone key exchange configurations are at least in part performed at step 301 of FIG. 3.

At step 2 of FIG. 7, data is cloned including key exchange configurations. In various embodiments, the data cloned is data encrypted using an encryption key accessible by source cloud instance 701 but not accessible by target cloud instance 705. The cloning of data includes the cloning of the key exchange specifications created as part of step 1 of FIG. 7. At step 2 of FIG. 7, key exchange specifications are provided from source cloud instance 701 to target cloud instance 705. In some embodiments, step 2 of FIG. 7 is performed at least in part at 303 of FIG. 3 by source cloud instance 701 and/or at step 601 of FIG. 6 by target cloud instance 705.

At step 3 of FIG. 7, post clone scripts are executed. In some embodiments, the cloning process includes post-cloning operations. In some embodiments, the post cloning operations include the creation of a key exchange request based on the cloned key exchange specification. The created key exchange request is a request for the encryption key required to decrypt the encrypted data cloned at step 2 of FIG. 7. In some embodiments, step 3 of FIG. 7 is performed at least in part at step 603 of FIG. 6 by target cloud instance 705.

At step 4 of FIG. 7, a key exchange message is sent that is signed with the target's private key. As shown in the example, the key exchange message is sent from target cloud instance 705 to source cloud instance 701. At step 4 of FIG. 7, the transmitted key exchange message includes a key exchange request. In some embodiments, step 4 of FIG. 7 is performed at least in part at step 605 of FIG. 6 by target cloud instance 705 and at 305 of FIG. 3 by source cloud instance 701.

At steps 5 and 6 of FIG. 7, the target's public key is retrieved. For example, a public key associated with target cloud instance 705 is retrieved by source cloud instance 701 from vault 703 and used to verify the key exchange request received at source cloud instance 701. In various embodiments, the request is verified, analyzed, and in the example of FIG. 7, the request is approved. Although not shown in FIG. 7, the analysis of the request is performed between steps 6 and 7 of FIG. 7 to determine whether to approve or reject the request. In some embodiments, the analysis steps are performed at steps 307 and/or 309 of FIG. 3 and/or using the process of FIG. 4.

At step 7 of FIG. 7, the key encrypted with the target's public key and the message signed with the source's private key is sent. As shown in the example, the message with the requested key is sent from source cloud instance 701 to target cloud instance 705. At step 7 of FIG. 7, the transmitted key is a response to the key exchange request sent at step 4 of FIG. 7. In various embodiments, the requested key is encrypted, and the message is signed. In some embodiments, step 7 of FIG. 7 is performed at least in part at 311 of FIG. 3 by source cloud instance 701 and at step 607 of FIG. 6 by target cloud instance 705. In some embodiments, the portions of step 7 of FIG. 7 performed by source cloud instance 701 are performed at least in part by using the process of FIG. 4.

At steps 8 and 9 of FIG. 7, the source's public key is retrieved. For example, a public key associated with source cloud instance 701 is retrieved by target cloud instance 705 from vault 703 and used to verify the response received at target cloud instance 705. In various embodiments, the response is verified, analyzed, and in the example of FIG. 7, the response includes the requested key. Although not shown in FIG. 7, the analysis of the response is performed to process the shared key included in the message sent at step 7 of FIG. 7. In some embodiments, the analysis steps are performed at step 611 of FIG. 6 by target cloud instance 705 and include importing the requested key.

At step 10 of FIG. 7, rekeying is performed. As shown in the example, target cloud instance 705 performs rekeying after the requested key provided by source cloud instance 701 is verified. In various embodiments, rekeying includes decrypting the data cloned as part of step 2 of FIG. 7 using the newly shared key, generating a new encryption key different from the shared key, and encrypting the decrypted data using the newly generated encryption key. In some embodiments, step 10 of FIG. 7 is performed at least in part at step 611 of FIG. 6 by target cloud instance 705.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
managing a cryptographic key of a first instance of a group of one or more cloud nodes providing a service;
determining to clone the first instance to create a second instance of a different group of one or more cloud nodes;
as a part of cloning the first instance to the second instance, cloning a cryptographic key exchange configurations from the first instance to the second instance, wherein the cloned cryptographic key exchange configuration is used by the second instance to initiate an automatic secure exchange of the cryptographic key separate from the cloning;
receiving as a part of the separate automatic secure exchange, a request generated using the cloned cryptographic key exchange configuration to share the cryptographic key with the second instance of the different group of one or more cloud nodes;
determining whether the second instance is allowed to access the cryptographic key;
in response to a determination that the second instance is allowed to access the cryptographic key, encrypting the cryptographic key with a target key of the second instance and signing the encrypted cryptographic key using a cryptographic signature of the first instance; and
providing the signed encrypted cryptographic key to the second instance.

2. The method of claim 1, further comprising:
identifying one or more cryptographic keys including the managed cryptographic key of the first instance configured for the first instance of the group of one or more cloud nodes providing the service;
preparing one or more cryptographic key exchange specifications associated with the one or more identified cryptographic keys; and
providing the one or more cryptographic key exchange specifications to the second instance of the different group of one or more cloud nodes.

3. The method of claim 2, wherein the received request to share the cryptographic key with the second instance of the different group of one or more cloud nodes is based at least in part on one of the one or more cryptographic key exchange specifications provided to the second instance.

4. The method of claim 3, wherein each of the prepared one or more cryptographic key exchange specifications includes a token of the first instance, and wherein the received request to share the cryptographic key with the second instance of the different group of one or more cloud nodes includes the token of the first instance.

5. The method of claim 2, wherein the one or more cryptographic key exchange specifications are provided to the second instance in part by replicating the first instance of the group of one or more cloud nodes to create the second instance of the different group of one or more cloud nodes.

6. The method of claim 1, wherein the cryptographic key is used to decode data accessible by the second instance of the different group of one or more cloud nodes.

7. The method of claim 1, further comprising:
creating a new cryptographic key for the first instance of the group of one or more cloud nodes providing the service, wherein the new cryptographic key is utilized to encrypt new data accessible by the first instance and wherein the cryptographic key is utilized to decrypt existing encrypted data.

8. The method of claim 1, further comprising:
receiving a key exchange approval configuration, wherein the key exchange approval configuration identifies one or more instances including the second instance of the different group of one or more cloud nodes.

9. The method of claim 8, wherein the key exchange approval configuration identifies an approval frequency associated with the second instance of the different group of one or more cloud nodes.

10. The method of claim 9, wherein the approval frequency specifies a single occurrence or a reoccurring occurrence.

11. A system, comprising:
one or more processors; and
a memory coupled to the one or more processors, wherein the memory is configured to provide the one or more processors with instructions which when executed cause the one or more processors to:
manage a cryptographic key of a first instance of a group of one or more cloud nodes providing a service;
determine to clone the first instance to create a second instance of a different group of one or more cloud nodes;
as a part of cloning the first instance to the second instance, clone a cryptographic key exchange configuration from the first instance to the second instance, wherein the cloned cryptographic key exchange configuration is used by the second instance to initiate an automatic secure exchange of the cryptographic key separate from the cloning;
receive as a part of the separate automatic secure exchange, a request generated using the cloned cryptographic key exchange configuration to share the cryptographic key with the second instance of the different group of one or more cloud nodes;

determine whether the second instance is allowed to access the cryptographic key;

in response to a determination that the second instance is allowed to access the cryptographic key, encrypt the cryptographic key with a target key of the second instance and sign the encrypted cryptographic key using a cryptographic signature of the first instance; and provide the signed encrypted cryptographic key to the second instance.

12. The system of claim 11, wherein the memory is further configured to provide the one or more processors with instructions which when executed cause the one or more processors to:

identify one or more cryptographic keys including the managed cryptographic key of the first instance configured for the first instance of the group of one or more cloud nodes providing the service;

prepare one or more cryptographic key exchange specifications associated with the one or more identified cryptographic keys; and provide the one or more cryptographic key exchange specifications to the second instance of the different group of one or more cloud nodes.

13. The system of claim 12, wherein the received request to share the cryptographic key with the second instance of the different group of one or more cloud nodes is based at least in part on one of the one or more cryptographic key exchange specifications provided to the second instance.

14. The system of claim 13, wherein each of the prepared one or more cryptographic key exchange specifications includes a token of the first instance, and wherein the received request to share the cryptographic key with the second instance of the different group of one or more cloud nodes includes the token of the first instance.

15. The system of claim 12, wherein the one or more cryptographic key exchange specifications are provided to the second instance in part by replicating the first instance of the group of one or more cloud nodes to create the second instance of the different group of one or more cloud nodes.

16. The system of claim 11, wherein the cryptographic key is used to decode data accessible by the second instance of the different group of one or more cloud nodes.

17. The system of claim 11, wherein the memory is further configured to provide the one or more processors with instructions which when executed cause the one or more processors to:

create a new cryptographic key for the first instance of the group of one or more cloud nodes providing the service, wherein the new cryptographic key is utilized to encrypt new data accessible by the first instance and wherein the cryptographic key is utilized to decrypt existing encrypted data.

18. The system of claim 11, wherein the memory is further configured to provide the one or more processors with instructions which when executed cause the one or more processors to:

receive a key exchange approval configuration, wherein the key exchange approval configuration identifies one or more instances including the second instance of the different group of one or more cloud nodes, and wherein the key exchange approval configuration identifies an approval frequency associated with the second instance of the different group of one or more cloud nodes.

19. A method, comprising:

receiving a cryptographic key exchange specification at a second instance of a group of one or more cloud nodes providing a service, wherein the second instance was created in cloning a first instance of a different group of one or more cloud nodes, and as a part of cloning the first instance to the second instance, the cryptographic key exchange specification was cloned from the first instance to the second instance;

using the cloned cryptographic key exchange specification to initiate an automatic secure exchange of a cryptographic key separate from the cloning including by preparing a key exchange request to share the cryptographic key of the cryptographic key exchange specification with the second instance;

as a part of the separate automatic secure exchange, providing the key exchange request generated using the cloned cryptographic key exchange specification to a first instance of a different group of one or more cloud nodes providing the service, wherein the first instance is configured with the cryptographic key;

receiving a signed encrypted cryptographic key from the first instance, wherein the signed encrypted cryptographic key is encrypted using a target key of the second instance and signed using a cryptographic signature of the first instance;

verifying a digital signature of the signed encrypted cryptographic key;

decrypting the signed encrypted cryptographic key into a clear key; and decrypting data stored in the group of one or more cloud nodes using the clear key.

20. The method of claim 19, further comprising:

receiving a newly generated key; and encrypting the decrypted data stored in the group of one or more cloud nodes using the newly generated key.

* * * * *